United States Patent
Wang et al.

(10) Patent No.: US 12,348,369 B2
(45) Date of Patent: Jul. 1, 2025

(54) AUTO-SCALING GROUP MANAGEMENT METHOD AND APPARATUS

(71) Applicant: Huawei Cloud Computing Technologies Co., Ltd., Guizhou (CN)

(72) Inventors: Nannan Wang, Shenzhen (CN); Boai Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/516,486

(22) Filed: Nov. 1, 2021

(65) Prior Publication Data
US 2022/0050719 A1 Feb. 17, 2022

Related U.S. Application Data

(63) Continuation of application No. PCT/CN2019/123663, filed on Dec. 6, 2019.

(51) Int. Cl.
| | |
|---|---|
| *H04L 41/08* | (2022.01) |
| *G06F 9/50* | (2006.01) |
| *H04L 41/0816* | (2022.01) |
| *H04L 41/0893* | (2022.01) |
| *H04L 41/0894* | (2022.01) |
| *H04L 41/0895* | (2022.01) |
| *H04L 41/0897* | (2022.01) |

(52) U.S. Cl.
CPC .......... *H04L 41/0886* (2013.01); *G06F 9/505* (2013.01); *G06F 9/5077* (2013.01); *H04L 41/0816* (2013.01); *H04L 41/0893* (2013.01); *H04L 41/0894* (2022.05); *H04L 41/0895* (2022.05); *H04L 41/0897* (2022.05)

(58) Field of Classification Search
CPC ............. H04L 41/0816; H04L 41/5041; H04L 41/0895; H04L 41/0893; G06F 9/5077; G06F 9/5083; G06F 11/3442
See application file for complete search history.

(56) References Cited

U.S. PATENT DOCUMENTS

| | | | |
|---|---|---|---|
| 9,647,889 B1 * | 5/2017 | Jones | .................. H04L 41/0816 |
| 10,355,942 B1 | 7/2019 | Mehta et al. | |

(Continued)

FOREIGN PATENT DOCUMENTS

| | | |
|---|---|---|
| CN | 106209409 A | 12/2016 |
| CN | 107786587 A | 3/2018 |

(Continued)

*Primary Examiner* — Barbara B Anyan

(57) ABSTRACT

An auto-scaling group management method is provided, including: receiving an auto-scaling group configuration message, the auto-scaling group configuration message including level information of an auto-scaling group, initialization configuration information of a compute instance of the auto-scaling group, and first auto-scaling policy information of the auto-scaling group; creating the compute instance of the auto-scaling group based on the initialization configuration information in a service server included in a level indicated by the level information of the auto-scaling group; and performing an operation on the compute instance of the auto-scaling group based on the auto-scaling policy information of the auto-scaling group. In the foregoing technical solution, a deployed auto-scaling group may support cross-layer deployment or operation.

7 Claims, 8 Drawing Sheets

(56) References Cited

U.S. PATENT DOCUMENTS

| | | | | |
|---|---|---|---|---|
| 10,411,960 | B1* | 9/2019 | Jones | H04L 41/0897 |
| 10,660,361 | B1* | 5/2020 | Drennan | B27K 9/007 |
| 11,038,986 | B1* | 6/2021 | Acar | H04L 67/10 |
| 2014/0059179 | A1* | 2/2014 | Lam | G06F 11/3442 709/219 |
| 2016/0323188 | A1* | 11/2016 | Guzman | H04L 41/0893 |
| 2016/0323197 | A1* | 11/2016 | Guzman | G06F 9/5083 |
| 2016/0323377 | A1* | 11/2016 | Einkauf | G06F 9/5077 |
| 2016/0378552 | A1* | 12/2016 | Taylor | G06F 11/3442 718/105 |
| 2018/0109610 | A1 | 4/2018 | Einkauf et al. | |
| 2019/0081879 | A1* | 3/2019 | Wu | H04L 41/0895 |
| 2021/0051060 | A1* | 2/2021 | Parvataneni | H04L 41/5041 |

FOREIGN PATENT DOCUMENTS

| | | |
|---|---|---|
| CN | 108540336 A | 9/2018 |
| CN | 109766174 A | 5/2019 |
| CN | 110427250 A | 11/2019 |

* cited by examiner

| Auto scaling group configuration message 200 | | | | | | | | | |
|---|---|---|---|---|---|---|---|---|---|
| Level information 210 | | | Initialization configuration information of a compute instance 220 | | Auto scaling policy information 230 | | | Resource scheduling policy information 240 | | | |
| First level 212 | Second level 215 | Third level 218 | Quantity parameter of a compute instance 223 | Configuration information of a compute instance 227 | Trigger condition 232 | Scaling policy 235 | Cooldown time 236 | Average allocation 243 | Specified proportion 245 | Specified cluster 246 | Allocation based on a load intensity 248 |
| | | | | | | | | | | | |

FIG. 2

| Auto scaling group configuration message 500 ||||||||||
| --- | --- | --- | --- | --- | --- | --- | --- | --- | --- |
| Level information 510 || Initialization configuration information of a compute instance 520 || Auto scaling policy information 530 ||| Resource scheduling policy information 540 ||| Conflict resolution policy 550 |
| First level 512 Second level 515 | Third level 518 | Quantity parameter of a compute instance 523 | Configuration information of a compute instance 527 | Trigger condition 532 | Scaling policy 535 | Cooldown time 536 | Average allocation 542 | Specified proportion 543 | Specified cluster 545 | Allocation based on a load Intensity 548 | |
| | | | | | | | | | | | |
| | | | | | | | | | | | |

FIG. 5

AUTO-SCALING GROUP MANAGEMENT METHOD AND APPARATUS

CROSS-REFERENCE TO RELATED APPLICATIONS

This application is a continuation of International Application No. PCT/CN2019/123663, filed on Dec. 6, 2019, the disclosure of which is hereby incorporated by reference in its entirety.

TECHNICAL FIELD

This application relates to the computer field, and more specifically, to an auto-scaling group management method and apparatus.

BACKGROUND

An auto-scaling (AS) service is a service that automatically adjusts service resources based on user service requirements and policies. A user can predefine an auto-scaling group and auto-scaling policy information corresponding to the auto-scaling group based on the service requirements. The user does not need to prepare a large quantity of service resources for user's services in advance.

Currently, the auto-scaling service can be deployed in a public cloud scenario. In a public cloud, most cloud computing services do not support cross-region deployment due to a physical region limitation. In this scenario, the deployed auto-scaling service does not support the cross-region deployment either. That is, when the auto-scaling service is deployed in the public cloud, a configured auto-scaling group can be used only in one region, and a compute instance can be scaled out (a new compute instance is created) or scaled in (a compute instance is released or hibernated) only in one region.

SUMMARY

This application provides an auto-scaling group management method. The management method supports cross-layer deployment of an auto-scaling group, and a compute instance of the auto-scaling group may also be operated at different layers.

According to a first aspect, an auto-scaling group management method is provided. The management method is applied to a service providing system. The service providing system includes an auto-scaling group management apparatus and a plurality of levels. Each level includes at least one service server. The management method includes:

The auto-scaling group management apparatus receives a first auto-scaling group configuration message. The first auto-scaling group configuration message includes level information of a first auto-scaling group, initialization configuration information of a compute instance of the first auto-scaling group, and auto-scaling policy information of the first auto-scaling group. The auto-scaling group management apparatus creates the compute instance of the first auto-scaling group based on the initialization configuration information of the compute instance of the first auto-scaling group in a service server included in a level indicated by the level information of the first auto-scaling group. The auto-scaling group management apparatus performs an operation on the compute instance of the first auto-scaling group based on the auto-scaling policy information of the first auto-scaling group.

It should be understood that, the operation on the compute instance in the auto-scaling group may include any one or more of the following: scaling out (creating a new compute instance in the auto-scaling group, or improving a specification of the compute instance in the auto-scaling group) and scaling in (releasing or hibernating a compute instance in the auto-scaling group, or reducing a specification of a compute instance in the auto-scaling group).

With reference to the first aspect, in some implementations of the first aspect, the auto-scaling group management apparatus generates a first auto-scaling command based on a running status of the compute instance of the first auto-scaling group and the auto-scaling policy information of the first auto-scaling group. The auto-scaling group management apparatus sends the first auto-scaling command to a service server on which the compute instance of the first auto-scaling group is created.

It should be noted that the auto-scaling group management apparatus does not send the first auto-scaling command to all service servers on which the compute instance of the first auto-scaling group is created, but sends, based on resource scheduling policy information, the first auto-scaling command to some or all service servers selected from the service servers on which the compute instance of the first auto-scaling group is created.

With reference to the first aspect, in some implementations of the first aspect, the first auto-scaling group configuration message may further include the resource scheduling policy information, and the resource scheduling policy information is used to determine a service server on which a compute instance that is initially created in the auto-scaling group is located and a service server on which a compute instance that needs to be scaled out or scaled in is located. It should be understood that, the resource scheduling policy information in the auto-scaling group is optional, and a user may configure the resource scheduling policy information or may not configure the resource scheduling policy information. When the user does not configure the resource scheduling policy information, the auto-scaling group management apparatus uses preset resource scheduling policy information.

With reference to the first aspect, in some implementations of the first aspect, the management method further includes: The auto-scaling group management apparatus receives a second auto-scaling group configuration message. The second auto-scaling group configuration message includes level information of a second auto-scaling group, initialization configuration information of a compute instance of the second auto-scaling group, and auto-scaling policy information of the second auto-scaling group. The auto-scaling group management apparatus creates the compute instance of the second auto-scaling group based on the initialization configuration information of the compute instance of the second auto-scaling group in a service server included in a level indicated by the level information of the second auto-scaling group. The service server included in the level indicated by the level information of the first auto-scaling group overlaps the service server included in the level indicated by the level information of the second auto-scaling group. The auto-scaling group management apparatus performs an operation on the compute instance of the second auto-scaling group based on the auto-scaling policy information of the second auto-scaling group.

With reference to the first aspect, in some implementations of the first aspect, the auto-scaling group management apparatus generates a second auto-scaling command based on a running status of the compute instance of the second auto-scaling group and the auto-scaling policy information of the second auto-scaling group. The auto-scaling group management apparatus sends the second auto-scaling command to a service server on which the compute instance of the second auto-scaling group is created.

It should be noted that the auto-scaling group management apparatus does not send the second auto-scaling command to all service servers on which the compute instance of the second auto-scaling group is created, but sends, based on resource scheduling policy information, the second auto-scaling command to some or all service servers selected from the service servers on which the compute instance of the second auto-scaling group is created.

With reference to the first aspect, in some implementations of the first aspect, the second auto-scaling group configuration message further includes a conflict resolution policy. The conflict resolution policy indicates a priority of the auto-scaling policy information. The management method further includes: The auto-scaling group management apparatus sends the conflict resolution policy to an overlapping service server. The overlapping service server is included in the level indicated by the level information of the first auto-scaling group and the level indicated by the level information of the second auto-scaling group. The overlapping service server receives the first auto-scaling command generated based on the first auto-scaling policy information. The overlapping service server receives the second auto-scaling command generated based on the second auto-scaling policy information. The overlapping service server selects, according to the conflict resolution policy, to execute the first auto-scaling command or the second auto-scaling command.

It should be understood that the auto-scaling group management apparatus may identify an overlapping service server at levels at which a plurality of auto-scaling groups created by the user are located, and may send the conflict resolution policy to the identified overlapping service server.

It should be noted that a priority of an auto-scaling command generated by the auto-scaling group management apparatus based on high-priority auto-scaling policy information indicated in the conflict resolution policy is high, and a priority of an auto-scaling command generated based on low-priority auto-scaling policy information indicated in the conflict resolution policy is low.

With reference to the first aspect, in some implementations of the first aspect, the auto-scaling group management apparatus may further send the conflict resolution policy to each service server on which the compute instance of the first auto-scaling group is created.

According to a second aspect, an auto-scaling group management method is provided. The management method is applied to an auto-scaling group management apparatus. The management method includes: receiving a first auto-scaling group configuration message, where the first auto-scaling group configuration message includes level information of a first auto-scaling group, initialization configuration information of a compute instance of the first auto-scaling group, and auto-scaling policy information of the first auto-scaling group; creating the compute instance of the first auto-scaling group based on the initialization configuration information of the compute instance of the first auto-scaling group in a service server included in a level indicated by the level information of the first auto-scaling group; and performing an operation on the compute instance of the first auto-scaling group based on the auto-scaling policy information of the first auto-scaling group.

It should be understood that, the operation on the compute instance in the auto-scaling group may include any one or more of the following: scaling out (creating a new compute instance in the auto-scaling group, or improving a specification of the compute instance in the auto-scaling group) and scaling in (releasing or hibernating a compute instance in the auto-scaling group, or reducing a specification of a compute instance in the auto-scaling group).

With reference to the second aspect, in some implementations of the second aspect, a first auto-scaling command is generated based on a running status of the compute instance of the first auto-scaling group and the auto-scaling policy information of the first auto-scaling group. The first auto-scaling command is sent to a service server on which the compute instance of the first auto-scaling group is created.

It should be noted that the auto-scaling group management apparatus does not send the first auto-scaling command to all service servers on which the compute instance of the first auto-scaling group is created, but sends, based on resource scheduling policy information, the first auto-scaling command to some or all service servers selected from the service servers on which the compute instance of the first auto-scaling group is created.

With reference to the second aspect, in some implementations of the second aspect, the first auto-scaling group configuration message may further include the resource scheduling policy information, and the resource scheduling policy information is used to determine a service server on which a compute instance that is initially created in the auto-scaling group is located and a service server on which a compute instance that needs to be scaled out or scaled in is located. It should be understood that, the resource scheduling policy information in the auto-scaling group is optional, and a user may configure the resource scheduling policy information or may not configure the resource scheduling policy information. When the user does not configure the resource scheduling policy information, the auto-scaling group management apparatus uses preset resource scheduling policy information.

With reference to the second aspect, in some implementations of the second aspect, the management method further includes: receiving a second auto-scaling group configuration message, where the second auto-scaling group configuration message includes level information of a second auto-scaling group, initialization configuration information of a compute instance of the second auto-scaling group, and auto-scaling policy information of the second auto-scaling group; creating the compute instance of the second auto-scaling group based on the initialization configuration information of the compute instance of the second auto-scaling group in a service server included in a level indicated by the level information of the second auto-scaling group, where the service server included in the level indicated by the level information of the first auto-scaling group overlaps the service server included in the level indicated by the level information of the second auto-scaling group; and performing an operation on the compute instance of the second auto-scaling group based on the auto-scaling policy information of the second auto-scaling group.

With reference to the second aspect, in some implementations of the second aspect, a second auto-scaling command is generated based on a running status of the compute instance of the second auto-scaling group and the auto-scaling policy information of the second auto-scaling group. The second auto-scaling command is sent to a service server on which the compute instance of the second auto-scaling group is created.

With reference to the second aspect, in some implementations of the second aspect, the second auto-scaling group configuration message further includes a conflict resolution policy. The conflict resolution policy indicates a priority of the auto-scaling policy information. The management method further includes: sending the conflict resolution policy to an overlapping service server, where the overlapping service server is included in the level indicated by the level information of the first auto-scaling group and the level indicated by the level information of the second auto-scaling group.

It should be understood that the auto-scaling group management apparatus may identify an overlapping service server at levels at which a plurality of auto-scaling groups created by the user are located, and may send the conflict resolution policy to the identified overlapping service server.

According to a third aspect, a scaling group management method is provided. The management method is applied to a service server. The service server is included in a level indicated by level information of a first auto-scaling group and a level indicated by level information of the second auto-scaling group. The management method includes: receiving a first auto-scaling command delivered by an auto-scaling group management apparatus, where the first auto-scaling command is generated by the auto-scaling group management apparatus based on first auto-scaling policy information included in a received first auto-scaling group configuration message; receiving a second auto-scaling command delivered by the auto-scaling group management apparatus, where the second auto-scaling command is generated by the auto-scaling group management apparatus based on second auto-scaling policy information included in a received second auto-scaling group configuration message; receiving a conflict resolution policy delivered by the auto-scaling group management apparatus, where the conflict resolution policy indicates a priority of the auto-scaling policy information; and selecting, according to the conflict resolution policy, to execute the first auto-scaling command or the second auto-scaling command.

According to a fourth aspect, an auto-scaling group management apparatus is provided, including:

a communications module, configured to receive a first auto-scaling group configuration message, where the first auto-scaling group configuration message includes level information of a first auto-scaling group, initialization configuration information of a compute instance of the first auto-scaling group, and auto-scaling policy information of the first auto-scaling group; and a processing module, configured to create the compute instance of the first auto-scaling group based on the initialization configuration information of the compute instance of the first auto-scaling group in a service server included in a level indicated by the level information of the first auto-scaling group.

The processing module is further configured to perform an operation on the compute instance of the first auto-scaling group based on the auto-scaling policy information of the first auto-scaling group.

With reference to the fourth aspect, in some implementations of the fourth aspect, the processing module is specifically configured to generate a first auto-scaling command based on a running status of the compute instance of the first auto-scaling group and the auto-scaling policy information of the first auto-scaling group.

The communications module is specifically configured to send the first auto-scaling command to a service server on which the compute instance of the first auto-scaling group is created.

With reference to the fourth aspect, in some implementations of the fourth aspect, the communications module is further configured to receive a second auto-scaling group configuration message, and the second auto-scaling group configuration message includes level information of a second auto-scaling group, initialization configuration information of a compute instance of the second auto-scaling group, and auto-scaling policy information of the second auto-scaling group.

The processing module is further configured to: create the compute instance of the second auto-scaling group based on the initialization configuration information of the compute instance of the second auto-scaling group in a service server included in a level indicated by the level information of the second auto-scaling group, where the service server included in the level indicated by the level information of the first auto-scaling group overlaps the service server included in the level indicated by the level information of the second auto-scaling group; and perform an operation on the compute instance of the second auto-scaling group based on the auto-scaling policy information of the second auto-scaling group.

With reference to the fourth aspect, in some implementations of the fourth aspect, the processing module is specifically configured to generate a second auto-scaling command based on a running status of the compute instance of the second auto-scaling group and the auto-scaling policy information of the second auto-scaling group.

The communications module is specifically configured to send the second auto-scaling command to a service server on which the compute instance of the second auto-scaling group is created.

With reference to the fourth aspect, in some implementations of the fourth aspect, the communications module is specifically configured to:

send the conflict resolution policy to an overlapping service server, where the overlapping service server is included in the level indicated by the level information of the first auto-scaling group and the level indicated by the level information of the second auto-scaling group.

According to a fifth aspect, a service server is provided. The service server is included a level indicated by level information of a first auto-scaling group and a level indicated by level information of the second auto-scaling group. The service server includes:

a communications module, configured to receive a first auto-scaling command delivered by an auto-scaling group management apparatus, where the first auto-scaling command is generated by the auto-scaling group management apparatus based on first auto-scaling policy information included in a received first auto-scaling group configuration message, where the communications module is further configured to receive a second auto-scaling command delivered by the auto-scaling group management apparatus. The second auto-scaling command is generated by the auto-scaling group management apparatus based on second auto-scaling policy information included in a received second auto-scaling group configuration message; and the communications module is further configured to receive a conflict resolution policy delivered by the auto-scaling group management apparatus. The conflict resolution policy indicates a priority of the auto-scaling policy information; and a processing module, configured to select, according to the conflict resolution policy, to execute the first auto-scaling command or the second auto-scaling command.

According to a sixth aspect, a global auto-scaling server is provided, including a memory and at least one processor. The memory is configured to store a program instruction. When an auto-scaling group management apparatus runs, the at least one processor executes the program instruction in the memory to perform the method according to any one of the second aspect or the possible implementations of the second aspect.

According to a seventh aspect, a service server is provided, including a memory and at least one processor. The memory is configured to store a program instruction. When the service server runs, the at least one processor executes the program instruction in the memory to perform the method according to any one of the third aspect or the possible implementations of the third aspect.

According to an eighth aspect, a service providing system is provided. The system includes at least one global auto-scaling server and a plurality of levels. Each level includes a plurality of service servers, and both each global auto-scaling server and each service server include a memory and at least one processor. The memory is configured to store a program instruction. When the at least one global auto-scaling server runs, a processor of the at least one global auto-scaling server executes the program instruction in the memory to perform the method according to any one of the second aspect or the possible implementations of the second aspect. When the plurality of service servers run, processors of the plurality of service servers execute the program instruction in the memory to perform the method according to any one of the third aspect or the possible implementations of the third aspect.

According to a ninth aspect, a non-transitory readable storage medium is provided, including a program instruction. When the program instruction is run by a computer, the computer performs the method according to any one of the second aspect or the possible implementations of the second aspect.

According to a tenth aspect, a non-transitory readable storage medium is provided, including a program instruction. When the program instruction is run by a computer, the computer performs the method according to any one of the third aspect or the possible implementations of the third aspect.

According to an eleventh aspect, a computer program product is provided, including a program instruction. When the program instruction is run by a computer, the computer performs the method according to any one of the second aspect or the possible implementations of the second aspect.

According to a twelfth aspect, a computer program product is provided, including a program instruction. When the program instruction is run by a computer, the computer performs the method according to any one of the third aspect or the possible implementations of the third aspect.

BRIEF DESCRIPTION OF DRAWINGS

FIG. 2 is a diagram where an auto-scaling group management apparatus provides an auto-scaling group configuration message for a user through a visualization window according to an embodiment;

FIG. 5 is a diagram where an auto-scaling group management apparatus provides an auto-scaling group configuration message for a user through a visualization window according to an embodiment;

DESCRIPTION OF EMBODIMENTS

Figure 1:
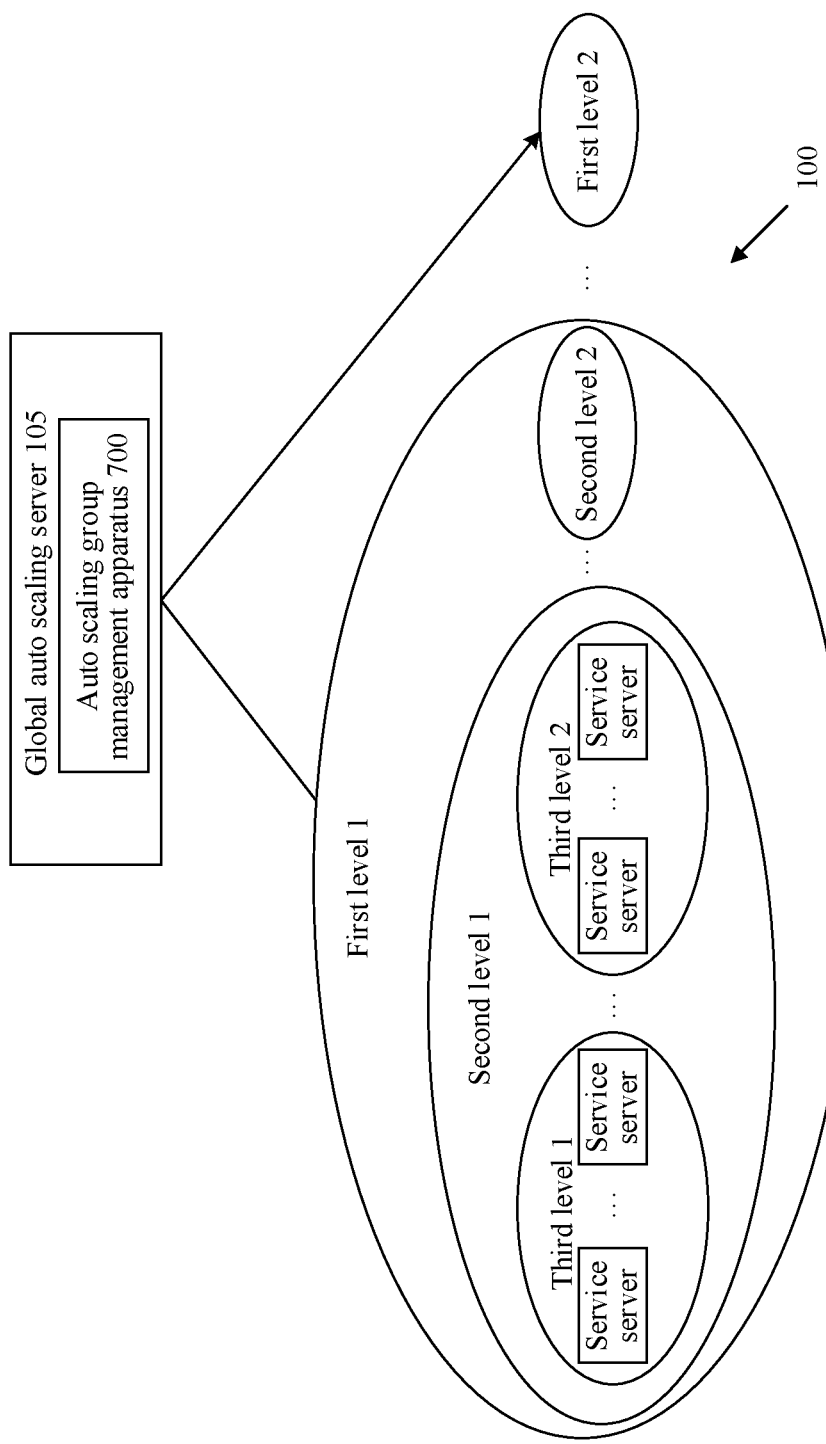
FIG. 1 is a diagram of a service providing system according to an embodiment.

The following describes technical solutions of this application with reference to accompanying drawings.

An auto-scaling (AS) service is a service that automatically adjusts service resources based on user service requirements and policies. A user can predefine an auto-scaling group and auto-scaling policy information corresponding to the auto-scaling group based on the service requirements. The user does not need to prepare a large quantity of service resources for user's services in advance. A service provisioning system can automatically adjust cloud server resources in the auto-scaling group based on configured auto-scaling policy information, to reduce workload of repeatedly adjusting, by a human, service resources to cope with service changes and pressure at peak hours. This automatic adjustment capability saves resources and labor costs of the user, and provides the user with an efficient computing resource management policy.

The service provisioning system includes one or more service servers. The service provisioning system may manage, based on the auto-scaling policy information, a quantity of compute instances (service resources) running on the one or more service servers in the auto-scaling group. The service provisioning system may complete an environment deployment of the compute instances, so as to ensure that the service runs smoothly. When an increase in the user service volume requires a larger quantity of compute instances, the auto-scaling service automatically increases the quantity of compute instances in the auto-scaling group to ensure service performance. When a decrease in the user service volume requires a smaller quantity of compute instances, the quantity of compute instances in the auto-scaling group is decreased to reduce costs. In the prior art, the auto-scaling service may be provided in a public cloud. Terms such as region and availability zone are involved in the public cloud. The region refers to a location of a data center, and may be a large region (for example, South China or North China), or may be a city (for example, Shenzhen or Dongguan). The availability zone (AZ) is a physical region of an equipment room or a cloud data center, and features an independent physical location or an independent network in the independent physical location. One region generally includes one or more availability zones that are interconnected with a low latency, and is used in a scenario such as disaster recovery backup and load balancing and a service in a same region. Due to a limitation of the physical region, most existing cloud services do not support cross-region deployment. Similarly, the auto-scaling service does not support the cross-region deployment either. That is, when the auto-scaling service is deployed in the public cloud, a configured auto-scaling group can be used only in one region, and a compute instance can be scaled out (a new compute instance is created) or scaled in (a compute instance is released or hibernated) only in one region.

It should be understood that the compute instance may be a virtual machine (VM), a container, or a software module that runs a service.

It should further be understood that one or more compute instances may run on each service server in the embodiments of this application, and the one or more compute instances may belong to one or more auto-scaling groups.

Each auto-scaling group includes at least one compute instance. A unit of scaling-out/scaling-in in the auto-scaling group may be the compute instance or a compute instance group. If the unit of scaling-out/scaling-in is the compute instance, then the compute instances included in a particular auto-scaling group are the same. When the unit of scaling-out/scaling-in is the compute instance group, then an auto-scaling group may include one or more types of compute instances. For example, each compute instance group can include N compute instances of a same type, or each compute instance group includes a plurality of types of compute instances (for example, a load balancing instance and a render instance, and then in one example each compute instance group includes one load balancing instance and five render instances).

For ease of description, the following uses an example in which a unit of scaling-out/scaling-in of each auto-scaling group is a compute instance.

An edge cloud is a type of cloud computing based on a widely-covered service server. An edge cloud service is a distributed computing mode in which computing resources (service servers) are distributed to places closer to users of the edge cloud service by providing a computing service by using the service server at a network edge side close to a data source. Compared with a centralized cloud computing service, the edge cloud service can better meet key requirements of industry digitization in an agile connection, a real-time service, data optimization, application intelligence, and security and privacy protection. The service providing system in this application may be supported by the edge cloud, or may be supported by the public cloud, a private cloud, or a hybrid cloud.

The service servers are widely distributed in different places. The service servers can be classified into different levels based on factors such as an administrative factor and a geographical factor, and therefore may comprise a first level, a second level, and a third level, for example. Different levels may be mutually nested. One first level may include one or more second levels, and one second level may include one or more third levels. Specifically, as an example, the first level may be, for example, Northeast Region, Northwest Region, or Central China Region. The second level may be a provincial district, for example, Guangdong Province or Shanxi Province. The third level may be a municipal district, for example, Shenzhen or Xi'an. The user can directly deploy a required auto-scaling group and corresponding auto-scaling policy information at a specified level.

It should be understood that the first level may also be referred to as a large region, the second level may be referred to as a secondary region, and the third level may be referred to as a sub-secondary region. One large region may include one or more secondary regions, and one secondary region may include one or more sub-secondary regions.

Figure 7:
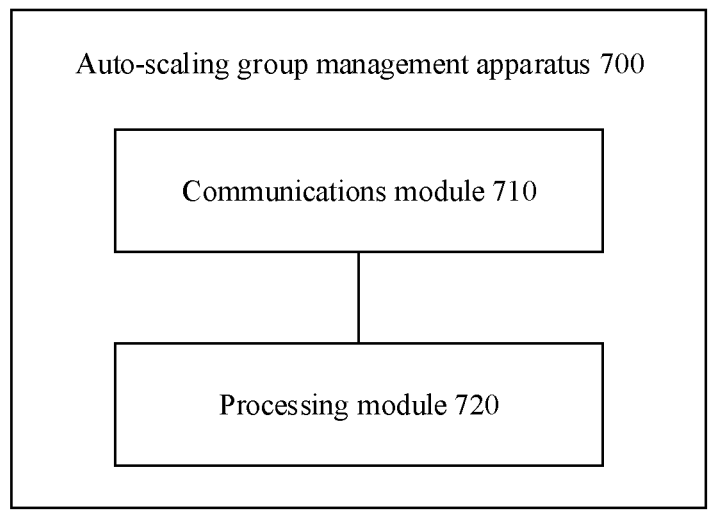
FIG. 7 is a diagram of an auto-scaling group management apparatus according to an embodiment.

FIG. 1 is a diagram of a service providing system 100 according to an embodiment. The service providing system 100 in the example shown includes a global auto-scaling server 105 including an auto-scaling group management apparatus 700. The auto-scaling group management apparatus 700 in some embodiments comprises the auto-scaling group management apparatus 700 as shown in FIG. 7 and discussed below. With reference to FIG. 1, the following describes in detail an application scenario applicable to an embodiment of this application.

In the figure, a plurality of service servers are divided into different levels. As an example, a plurality of first levels, for example, a first level 1 and a first level 2, may be obtained through division based on factors such as an administrative factor and a geographical factor. The first level 1 may include a plurality of second levels, for example, a second level 1 and a second level 2. Each second level includes a plurality of third levels. The second level 1 is used as an example. The second level 1 includes a plurality of third levels, for example, a third level 1 and a third level 2. Each third level may include a plurality of service servers. For example, the third level 1 may include a plurality of service servers, and the third level 2 may also include a plurality of service servers. Another first level may also include a plurality of second levels, and each second level includes a plurality of third levels. For example, the first layer 2 is similar to the first layer 1. For details, refer to the description of the first layer 1. Details are not described herein again.

It should be noted that each level may include one or more service servers, and a quantity of service servers included in each level in FIG. 1 is merely used as an example.

The auto-scaling group management apparatus 700 runs in the global auto-scaling server 105 in the embodiment shown. The auto-scaling group management apparatus 700 may provide, for a user, an application programming interface (API) or a visualization window created by the user for managing an auto-scaling group. The user may complete operations such as creation, configuration, and query of the auto-scaling group by using the auto-scaling group management apparatus 700.

The following describes a process in which the user configures the auto-scaling group by using the auto-scaling group management apparatus 700. The user completes configuration of the auto-scaling group by inputting an auto-scaling group configuration message into the auto-scaling group management apparatus 700. The auto-scaling group configuration message is discussed below.

FIG. 2 is a diagram of an auto-scaling group configuration message 200 according to an embodiment. An auto-scaling group management apparatus provides the auto-scaling group configuration message for a user through a visualization window. The Figure shows an example scenario in which the auto-scaling group management apparatus provides an auto-scaling group configuration message for a user through a visualization window according to an embodiment of this application. The user may perform selection according to an option of each piece of information in the auto-scaling group configuration message. It should be understood that resource scheduling policy information in an auto-scaling group is optional, and the user may configure the resource scheduling policy information or may not configure the resource scheduling policy information. When the user does not configure the resource scheduling policy information, the auto-scaling group management apparatus 700 uses preset resource scheduling policy information.

(1) Level Information 210

When configuring the auto-scaling group, the user can specify a level to which the auto-scaling group belongs and deploy the auto-scaling group at this level. The level information 210 may indicate, for example, any one or more of the levels described above. For details, refer to the foregoing description. Details are not described herein again.

(2) Initialization Configuration Information of a Compute Instance 220

The initialization configuration information of the compute instance 220 in the auto-scaling group may include a quantity parameter of the compute instance 223 in the auto-scaling group, for example, an initial quantity of compute instances in the auto-scaling group, a maximum value and a minimum value of the quantity of compute instances in the auto-scaling group, and an expected value of the compute instance in the auto-scaling group. The initialization configuration information of the compute instance 220 may further include configuration information of the compute instance 227, for example, information such as a specification of the compute instance, a type (for example, a render instance or a load balancing instance) of the compute instance, network configuration of the compute instance, a mirror used by the compute instance, and a user identifier.

(3) Auto-Scaling Policy Information 230

The auto-scaling policy information 230 of the auto-scaling group includes a trigger condition 232 and an operation that is performed on a compute instance in the auto-scaling group and that is triggered when the specified trigger condition 232 is met. The auto-scaling policy information 230 may include a scaling policy 235 comprising a static scaling policy information or a dynamic scaling policy information.

The static scaling policy information includes a specified static trigger condition, for example, a time condition, and an operation that is performed on a compute instance in the auto-scaling group and that is triggered when the specified static trigger condition is met.

As an example, a type of possible auto-scaling policy information 230 is listed. Trigger condition: 11:00 p.m. to 13:00 p.m. Auto-scaling policy information: Two compute instances are scaled in the level at which the auto-scaling group is located.

The dynamic scaling policy information includes a specified dynamic trigger condition and an operation that is performed on a compute instance in the auto-scaling group and that is triggered when the specified dynamic trigger condition is met.

As an example, a type of possible auto-scaling policy information is listed. Trigger condition: Load of any compute instance in the auto-scaling group reaches 80% of full load. Auto-scaling policy information: Two compute instances are scaled out in the level at which the auto-scaling group is located.

Optionally, the auto-scaling policy information 230 further includes a cooldown time 236. The cooldown time 236 does not allow an operation to be performed on the compute instance in the auto-scaling group. Configuration of the cooldown time can prevent frequent operations on the compute instance in the auto-scaling group.

It should be understood that, in the foregoing policy information, the operation on the compute instance in the auto-scaling group may include any one or more of the following: scaling out (creating a new compute instance in the auto-scaling group, or improving the specification of the compute instance in the auto-scaling group) and scaling in (releasing or hibernating a compute instance in the auto-scaling group, or reducing a specification of a compute instance in the auto-scaling group).

Optionally, the foregoing auto-scaling policy information 230 further includes configuration information of a compute instance to be scaled out/scaled in in the auto-scaling group. As an example, the auto-scaling policy information 230 further includes a specification of the compute instance to be scaled out/scaled in at a corresponding level, and a type (for example, a render instance or a load balancing instance) of the compute instance to be scaled out/scaled in.

Optionally, in some embodiments, the auto-scaling group configuration message may further include resource scheduling policy information 240.

(4) Resource Scheduling Policy Information 240

The resource scheduling policy information 240 of the auto-scaling group is used to determine a service server on which a compute instance that is initially created in the auto-scaling group is located and a service server on which a compute instance that needs to be scaled out or scaled in is located.

The resource scheduling policy information 240 of the auto-scaling group may include any one or more of the following: average allocation 243, allocation by a specified cluster 246, allocation in a specified proportion 245, automatic allocation based on a load intensity 248, and the like.

For example, one or more compute instances in each auto-scaling group are of a same type. A specific quantity of compute instances may be deployed on a corresponding service server based on one or more of the foregoing resource scheduling policy information. For example, in an initialization phase, compute instances to be scaled out/scaled in may be evenly allocated between a plurality of service servers in the level corresponding to the auto-scaling group based on one or more of the maximum value, the minimum value, and the expected value of the quantity of computing instances in the auto-scaling group. For another example, in a scaling-out/scaling-in phase, based on a quantity of compute instances to be scaled out/scaled in and the configuration information of the compute instance that are included in the auto-scaling policy information in the auto-scaling group, and based on a load intensity of the plurality of service servers in the level corresponding to the auto-scaling group, the compute instances to be scaled out/scaled in in the service servers may be allocated.

It should be noted that the foregoing level information, the initialization configuration information of the compute instance 220, the auto-scaling policy information 230, and the resource scheduling policy information 240 may be sent to the auto-scaling group management apparatus 700 by using one or more auto-scaling group configuration messages. For example, the user may first send, to the auto-scaling group management apparatus 700, one or more auto-scaling group configuration messages that include level information and initialization configuration information of the compute instance, so as to create a compute instance group in a specified level. Then, the user sends the auto-scaling policy information to the auto-scaling group management apparatus 700 by using the auto-scaling group configuration message. Then, the user indicates to apply the sent auto-scaling policy information to the created compute instance group to complete creation of the auto-scaling group.

In a scenario in which each auto-scaling group includes one or more compute instance groups, a method for deploying a specific quantity of compute instances on a corresponding service server based on the resource scheduling policy information is similar to the foregoing method. For details, refer to the foregoing description. Details are not described herein again.

Figure 3:
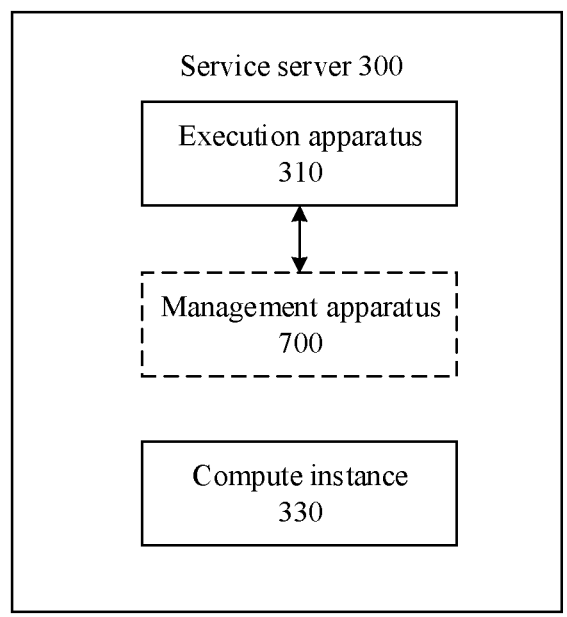
FIG. 3 is a diagram of a service server according to an embodiment.

FIG. 3 is a diagram of a service server 300 according to an embodiment. The service server 300 in the embodiment shown incudes an execution apparatus 310, a management apparatus 700 coupled to or in communication with the execution apparatus 310, and a compute instance 330. Referring to FIG. 3, the management apparatus 700 may be used as a decision-making entity in a level to which the service server 300 belongs, and is responsible for managing information about the at least one compute instance running on all service servers in the level to which the service server belongs, and delivering a scaling command. As an execution entity of the service server 300, the execution apparatus 310 is responsible for implementing the scaling command delivered by the management apparatus 700.

The following separately describes the management apparatus and the execution apparatus in detail.

(1) Management Apparatus 700

Each level may include one or more service servers. For each level, the auto-scaling group management apparatus 700 may select, according to a distributed master selection algorithm, one service server from a plurality of service servers included in one level as a master service server in the level. Another service server included in the level may be referred to as a slave service server.

The management apparatus 700 may be deployed on the master service server, so that the master service server manages, by using the management apparatus 700, an instance or an instance group in the level to which the master service server belongs.

Specifically, in a possible implementation, the management apparatus 700 may be deployed on all service servers in advance, and after one of the service servers is selected as a master service server in a level to which the service server belongs, a management apparatus 700 deployed on the master service server is activated, and a management apparatus 700 may not be deployed on a remaining slave service server, or the deployed management apparatus may not be activated. In another possible implementation, after one service server is selected, according to the distributed master selection algorithm, from the plurality of service servers in the level as the master service server in the level, a management apparatus 700 may further be deployed on the master service server.

The management apparatus 700 is used as a decision-making body in the master service server, and functions of the management apparatus 700 may include one or more of the following: storing an auto-scaling group configuration message configured by a user in the level, monitoring a running status of a compute instance in the level, determining, based on auto-scaling policy information included in the auto-scaling group configuration message, auto-scaling of the compute instance in the level, determining, based on resource scheduling policy information of an auto-scaling group, a service server on which an operated compute instance is located, and synchronizing a result of the auto-scaling group and an operation result of auto-scaling of the compute instance to the auto-scaling group management apparatus 700. The following describes in detail the functions of the management apparatus.

1. Storing the auto-scaling group configuration information configured by the user in the level.

The auto-scaling group configuration message configured by the user by using the auto-scaling group management apparatus 700 may be forwarded by the auto-scaling group management apparatus 700 to the management apparatus on the master service server, and stored by the management apparatus.

2. Monitoring the running status of the compute instance in the level.

The management apparatus on the master service server maintains a message channel between the management apparatus on the master service server and the slave service server in the level, and periodically receives a running status of a compute instance that runs on the slave service server and that is sent by the slave service server. In addition, the management apparatus on the master service server also periodically receives a running status of a compute instance running on the master service server.

Specifically, the management apparatus on the master service server may receive monitoring data of each compute instance. The monitoring data may include any one or more of the following: a quantity of abnormal compute instances, a quantity of abnormal processes, usage of a central processing unit (CPU), memory usage, a quantity of network connections, bandwidth usage, and another parameter that can reflect the running status of the compute instance.

3. Determining, based on the auto-scaling policy information, auto-scaling of the compute instance in the level.

The management apparatus on the master service server may determine, based on the stored auto-scaling group configuration message, for example, one or more of the auto-scaling policy information and initialization configuration information of the compute instance, a quantity of compute instances that need to be operated in the auto-scaling group and a type of the compute instance that needs to be operated in the auto-scaling group.

Specifically, when determining that the auto-scaling group meets a trigger condition in the auto-scaling policy information, the management apparatus on the master service server may determine, based on the auto-scaling policy information, the quantity of compute instances that need to be operated in the auto-scaling group and the type of the compute instance that needs to be operated in the auto-scaling group, and generate an auto-scaling command.

4. Sending, based on the resource scheduling policy information, the auto-scaling command to the determined service server in the level.

The management apparatus on the master service server may determine, in the level based on the resource scheduling policy information, the service server on which the compute instance that needs to be operated is located, and send the auto-scaling command to the determined service server in the level. The auto-scaling command includes an operation on the compute instance in the auto-scaling group, the quantity of compute instances that need to be operated, and the type of the compute instance that needs to be operated.

5. Synchronizing the creation result and the operation result of the auto-scaling group to the auto-scaling group management apparatus 700.

The management apparatus on the master service server may actively synchronize the creation result and the operation result of the auto-scaling group to the auto-scaling group management apparatus 700 through an interface. The creation result of the auto-scaling group includes an initial creation status of the compute instance in the auto-scaling group, and the operation result of the auto-scaling group includes a status of executing the auto-scaling policy information by the compute instance in the auto-scaling group.

(2) Execution Apparatus 310

An execution apparatus 310 on each service server is responsible for monitoring a compute instance 330 running on the service server 300, reporting a running status of the compute instance 330 running on the service server 300 to the management apparatus on the master service server, and implementing an auto-scaling command delivered by the management apparatus on the master service server.

The execution apparatus 310 may periodically obtain monitoring data of the compute instance 330 running on the service server 300.

The execution apparatus 310 may further receive the auto-scaling command delivered by the management apparatus on the master service server. The auto-scaling command includes an operation on the compute instance in the auto-scaling group, a quantity of compute instances that need to be operated, and a type of the compute instance that needs to be operated. The execution apparatus 310 performs, based on the auto-scaling command, a corresponding operation on the compute instance 330 running on the service server 300. The following first describes in detail a process in which the user creates the auto-scaling group.

Figure 4:
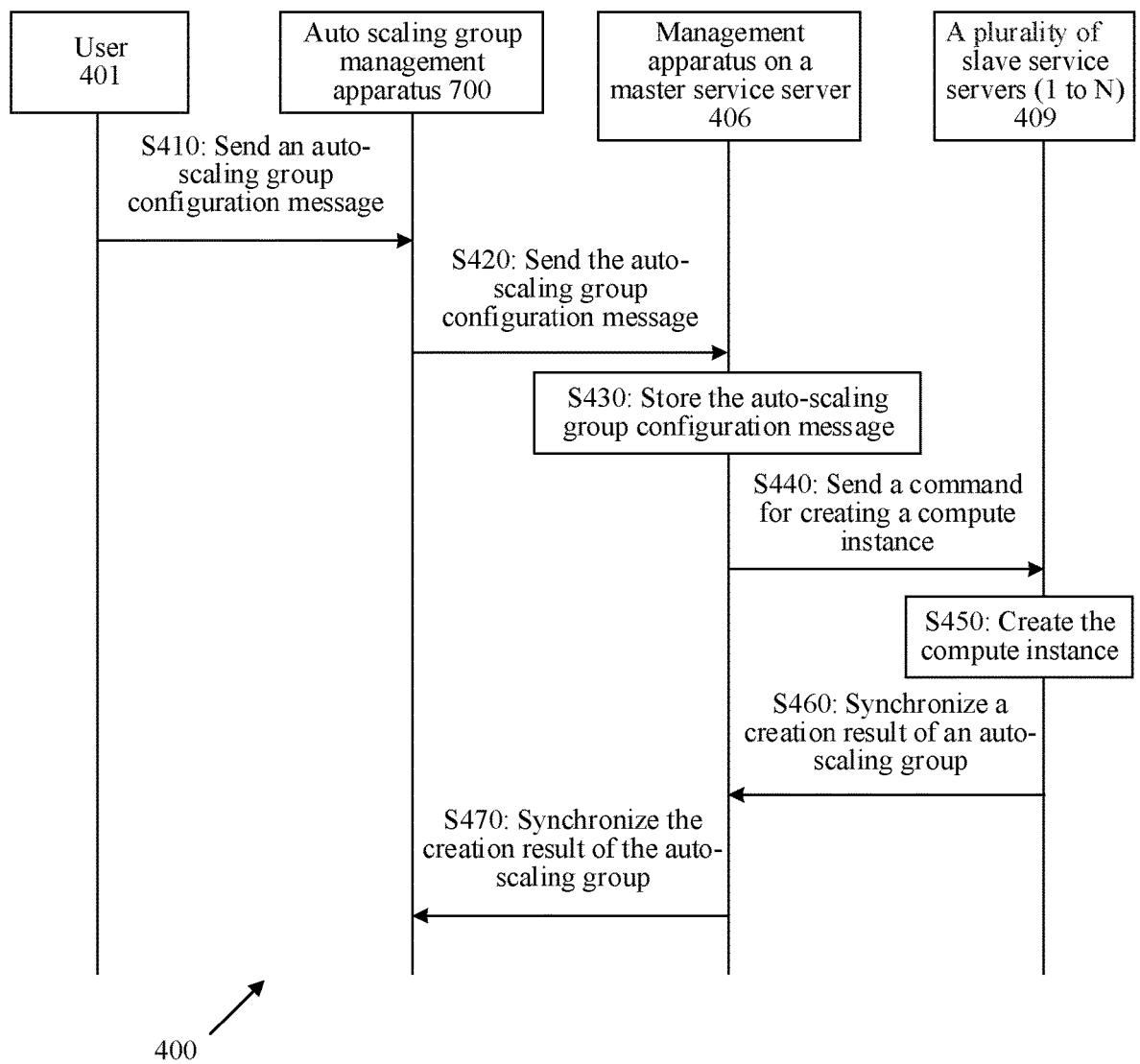
FIG. 4 is a flowchart of a method for creating an auto-scaling group according to an embodiment.

FIG. 4 is a flowchart 400 of a method for creating an auto-scaling group according to an embodiment. The method in the embodiment shown includes steps 410 to 470. The following separately describes the steps 410 to 470 in detail.

Step 410: A user sends an auto-scaling group configuration message to an auto-scaling group management apparatus 700.

The user sends the auto-scaling group configuration message to the auto-scaling group management apparatus 700 through an API or a visualization window, to complete creation of the auto-scaling group.

The auto-scaling group configuration message may include but is not limited to: level information, initialization configuration information of a compute instance, and auto-scaling policy information. Optionally, the auto-scaling group configuration message further includes resource scheduling policy information.

Step 420: The auto-scaling group management apparatus 700 sends the auto-scaling group configuration message to a management apparatus on a master service server.

Specifically, the auto-scaling group management apparatus 700 may determine, based on the level information in the auto-scaling group configuration message, a level to which the auto-scaling group that the user needs to create belongs, and determine the master service server in the level, and send the auto-scaling group configuration message to the management apparatus on the master service server. Optionally, if the management apparatus on the master service server is not activated by default, before sending the auto-scaling group configuration message, the auto-scaling group management apparatus 700 further needs to activate the management apparatus on the master service server.

Step 430: The management apparatus on the master service server stores the auto-scaling group configuration message.

After receiving the auto-scaling group configuration message sent by the auto-scaling group management apparatus 700, the management apparatus on the master service server may store the auto-scaling group configuration message, and determine, based on the auto-scaling group configuration message, a quantity of compute instances that need to be initially created on each service server in the level to which the created auto-scaling group belongs.

Specifically, the management apparatus on the master service server may determine, based on the initialization configuration information that is of the compute instance in the auto-scaling group and that is included in the auto-scaling group configuration message, a quantity of compute instances that are initially created in the auto-scaling group, a specification of the compute instance that is initially created in the auto-scaling group, a type of the compute instance that is initially created in the auto-scaling group, and the like. The management apparatus may further determine, based on the resource scheduling policy information that is in the auto-scaling group and that is included in the auto-scaling group configuration message, the quantity of compute instances that need to be initially created on each service server in the level to which the auto-scaling group belongs.

Step 440: The management apparatus on the master service server sends a command for creating the compute instance to the service server in the level to which the auto-scaling group belongs.

After determining a compute instance that needs to be initially created on which service server in the level to which the auto-scaling group belongs, and a type and a quantity of compute instances that need to be initially created on each service server, the management apparatus on the master service server sends the command for creating the compute instance to an execution apparatus of the determined service server. Each command for creating the compute instance includes the type and quantity of compute instances that need to be created.

It should be understood that the service server includes the master service server in the level to which the auto-scaling group belongs, or include a slave service server in the level to which the auto-scaling group belongs, or include the master service server and the slave service server in the level to which the auto-scaling group belongs.

Step 450: The execution apparatus on each service server creates the compute instance based on the command for creating the compute instance sent by the management apparatus on the master service server.

After each service server in the level to which the auto-scaling group belongs receives the command that is for creating the compute instance and that is delivered by the management apparatus on the master service server, the execution apparatus on each service server determines, based on the type and the quantity of compute instances that need to be created and that are carried in the command for creating the compute instance, create the compute instance.

Step 460: The execution apparatus on each service server sends a creation result of the auto-scaling group to the management apparatus on the master service server.

The creation result of the auto-scaling group includes a creation result of the compute instance. The creation result of the compute instance may include information about whether a creation process succeeds, an identifier (ID) of the created compute instance, and the like.

Step 470: The management apparatus on the master service server sends the creation result of the auto-scaling group to the auto-scaling group management apparatus 700.

Specifically, the management apparatus on the master service server may actively send the creation result of the auto-scaling group to the auto-scaling group management apparatus 700. Alternatively, the management apparatus on the master service server may store the creation result of the auto-scaling group, and after receiving a query message of the user, synchronize the creation result of the auto-scaling group to the auto-scaling group management apparatus 700.

In this embodiment of this application, a plurality of auto-scaling groups may be created by using the method shown in FIG. 4. For ease of description, the following uses creation of a first auto-scaling group and a second auto-scaling group as an example for description. The first auto-scaling group is deployed at a first level, the second auto-scaling group is deployed at a second level, and one first level includes one or more second levels.

Because the second level is included in the first level, and service servers at the first level and the second level overlap, a service server that belongs to both the first level and the second level is referred to as an overlapping service server. When the overlapping service server executes an auto-scaling command corresponding to the first auto-scaling group and an auto-scaling command corresponding to the second auto-scaling group, a conflict may occur, for example, an operation conflict of compute instances in the overlapping service server, a conflict of quantity of compute instances that need to be operated, and a conflict of an execution sequence of auto-scaling commands.

FIG. 5 is a diagram where an auto-scaling group management apparatus 500 provides an auto-scaling group configuration message 500 for a user through a visualization window according to an embodiment. In this embodiment of this application, the user may further send a conflict resolution policy to the auto-scaling group management apparatus 700. Specifically, the user sends the conflict resolution policy to the auto-scaling group management apparatus 700 through the API or the visualization window. The auto-scaling group configuration message includes a conflict resolution policy 550.

A priority of auto-scaling policy information may be determined according to the conflict resolution policy 550. Specifically, the user may directly specify a priority of each piece of auto-scaling policy information in the conflict resolution policy; or may indicate, in the conflict resolution policy, to determine the priority of the auto-scaling policy information based on an effective time of the auto-scaling policy information, for example, a priority of auto-scaling policy information that is first recorded into the auto-scaling group management apparatus 700 is higher (in other words, a priority of auto-scaling policy information of an auto-scaling group that is first created is higher); or may indicate, in the conflict resolution policy, to determine the priority based on level information of an auto-scaling group, for example, a priority of auto-scaling policy information of an auto-scaling group with a higher level is higher. A priority of an auto-scaling command generated based on high-priority auto-scaling policy information is high, and a priority of an auto-scaling command generated based on low-priority auto-scaling policy information is low. An overlapping service server may implement an auto-scaling command according to the conflict resolution policy configured in advance.

In a possible implementation, if the overlapping service server first receives a high-priority auto-scaling command, scaling is performed, based on the high-priority auto-scaling command, on a compute instance running on the overlapping service server, and a low-priority auto-scaling command received within a cooldown time is discarded and not implemented. The overlapping service server sends a notification about a conflict between the auto-scaling commands to a management apparatus on a master service server that sends the discarded auto-scaling command. Then, the management apparatus on the master service server sends the notification about the conflict between the auto-scaling commands to the auto-scaling group management apparatus 700. The auto-scaling group management apparatus 700 prompts the user in a notification manner.

In another possible implementation, if the overlapping service server receives a high-priority auto-scaling command (after a cooldown time passes) only after implementing a low-priority auto-scaling command, the overlapping service server puts the high-priority auto-scaling command into a queue of to-be-executed auto-scaling commands for execution.

In another possible implementation, if the overlapping service server simultaneously receives a high-priority auto-scaling command and a low-priority auto-scaling command, the overlapping service server executes the high-priority auto-scaling command, and discards the low-priority auto-scaling command.

Figure 6:
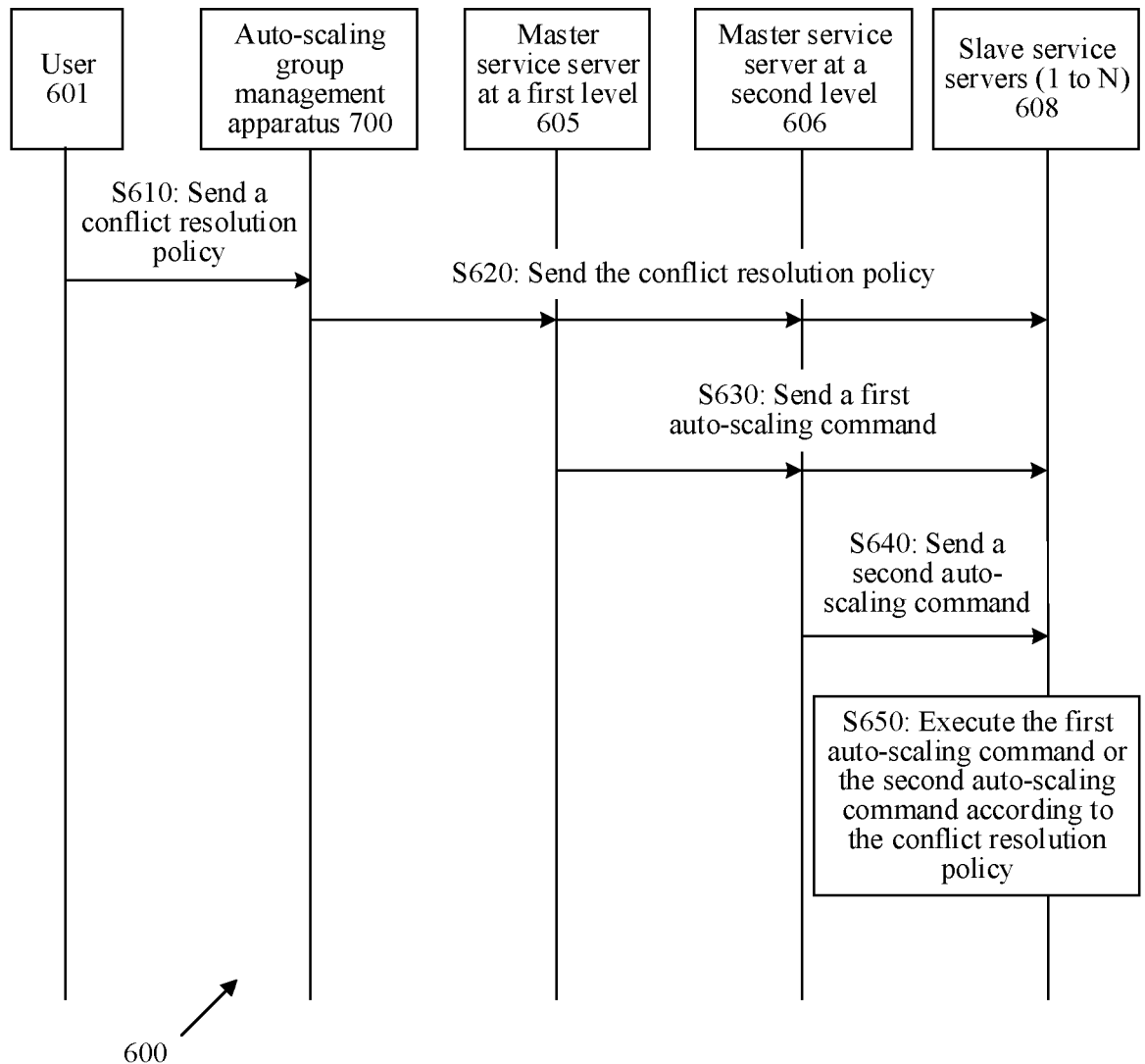
FIG. 6 is a flowchart of a method for performing auto-scaling on a compute instance by a service server according to a conflict resolution policy according to an embodiment.

FIG. 6 is a flowchart 600 of a method for performing auto-scaling on a compute instance by a service server according to a conflict resolution policy according to an embodiment. With reference to FIG. 6, the following describes in detail a process in which an overlapping service server performs, according to a conflict resolution policy, auto-scaling on a compute instance running on the overlapping service server. As shown in FIG. 6, the method may include steps 610 to 650. The following separately describes the steps 610 to 650 in detail.

S610: A user 601 sends a conflict resolution policy to an auto-scaling group management apparatus 700.

The user 601 sends an auto-scaling group configuration message to the auto-scaling group management apparatus 700 through an API or a visualization window, and the auto-scaling group configuration message includes the conflict resolution policy.

It should be understood that before step 610 is performed, step 410 is performed twice to complete creation of two auto-scaling groups. For ease of description, an example in which a first auto-scaling group and a second auto-scaling group are created by using the method shown in FIG. 4 is used in FIG. 6. The first auto-scaling group is deployed at a first level, the second auto-scaling group is deployed at a second level, and one first level may include one or more second levels.

For example, in this embodiment of this application, the conflict resolution policy specified by the user 60 is that a priority of auto-scaling policy information of the first auto-scaling group is higher than a priority of auto-scaling policy information of the second auto-scaling group.

Step 620: The auto-scaling group management apparatus 700 sends the conflict resolution policy to an execution apparatus of each service server on which a compute instance of the first auto-scaling group is deployed at the first level, and delivers the conflict resolution policy to an execution apparatus of each service server on which a compute instance of the second auto-scaling group is deployed at the second level.

The execution apparatus that receives the conflict resolution policy and that is in the service server may store the conflict resolution policy.

Step 630: A management apparatus on a master service server at the first level sends a first auto-scaling command to the service server at the first level based on a first auto-scaling group configuration message.

It should be understood that before step 630, an initialization process of the first auto-scaling group and the second auto-scaling group has been completed. In other words, step 450 in FIG. 4 has been performed.

Referring to the flowchart corresponding to FIG. 4, the management apparatus on the master service server at the first level may deliver the first auto-scaling command to the service server at the first level based on the auto-scaling policy information and resource scheduling policy information that are included in the first auto-scaling group configuration message.

As an example, the auto-scaling policy information of the first auto-scaling group includes: if a quantity of network connections of compute instances at the first layer is greater than 80%, 10 compute instances are scaled out at the first layer.

When determining that received monitoring data of the compute instance of the first auto-scaling group meets a trigger condition in the auto-scaling policy information of the first auto-scaling group, the management apparatus on the master service server at the first level may send the first auto-scaling command to the service server at the first level based on the resource scheduling policy information of the first auto-scaling group.

The first auto-scaling command includes an operation on the compute instance in the first auto-scaling group, a quantity of compute instances that need to be operated, and a type of the compute instance that needs to be operated.

Step 640: A management apparatus on a master service server at the second level sends a second auto-scaling command to the service server at the second level based on a second auto-scaling group configuration message.

In this embodiment of this application, the management apparatus on the master service server at the second level may send the second auto-scaling command to the service server at the second level based on the auto-scaling policy information and resource scheduling policy information that are included in the second auto-scaling group configuration message.

As an example, the auto-scaling policy information of the second auto-scaling group includes: if average CPU usage of compute instances at the second layer is less than 20%, two compute instances are scaled in at the second layer.

Specifically, a method for delivering, by the management apparatus on the master service server at the second level, the second auto-scaling command to the service server at the second level based on the auto-scaling policy information and the resource scheduling policy information of the second auto-scaling group is similar to that in step 630. For details, refer to the description in step 630. Details are not described herein again.

It should be noted that there is no sequence between step 630 and step 640. Step 630 may be performed before step 640. Alternatively, step 640 may be performed before step 630. Alternatively, step 630 and step 640 are simultaneously performed. This is not limited in this application. Step 650: The overlapping service server selects, according to the stored conflict resolution policy, to execute the first auto-scaling command or the second auto-scaling command. The overlapping server is a service server that belongs to the first level and a service server that belongs to the second level. The overlapping server may be a master service server or a slave service server. In FIG. 6, an example in which the overlapping server is the slave service server is used.

For example, the user separately configures the first auto-scaling group and the second auto-scaling group for a service 1, and both the first auto-scaling group and the second auto-scaling group include at least one compute instance used to run the service 1. The first auto-scaling group is deployed at the first level, and the first level includes a service server 1 and a service server 2. The second auto-scaling group is deployed at the second level, and the second level includes the service server 2 and a service server 3.

The first auto-scaling command delivered by the master service server (for example, the service server 1) at the first level to the service server 2 at the first level is to scale out three compute instances.

The second auto-scaling command delivered by the master service server (for example, the service server 3) at the second level to the service server 2 at the second level is to scale in one compute instance.

For the overlapping service server 2 that belongs to both the first level and the second level, if an execution apparatus on the service server 2 performs scaling based on the first auto-scaling command delivered by the master service server in the first level, three compute instances need to be scaled out. If the service server 2 performs scaling based on the second auto-scaling command delivered by the master service server at the second layer, one compute instance needs to be scaled in.

In this case, the execution apparatus on the service server 2 may implement, according to the stored conflict resolution policy, an auto-scaling command corresponding to auto-scaling policy information with a higher priority.

The foregoing describes in detail the auto-scaling group management method provided in the embodiments of this application with reference to FIG. 1 to FIG. 6. The following describes in detail apparatus embodiments of this application. It should be understood that the descriptions of the method embodiments correspond to descriptions of the apparatus embodiments. Therefore, for parts that are not described in detail, refer to the foregoing method embodiments.

FIG. 7 is a diagram of an auto-scaling group management apparatus 700 according to an embodiment. FIG. 7 shows an auto-scaling group management apparatus 700 according to an embodiment of this application. The auto-scaling group management apparatus 700 is configured to provide a global auto-scaling (AS) group service for a user. The auto-scaling group management apparatus 700 may include a communications module 710 and a processing module 720.

Specifically, the communications module 710 is configured to receive an auto-scaling group configuration message that is sent by the user through an API or a visualization window. For details, refer to the foregoing description. Details are not described herein again.

The processing module 720 is configured to determine, based on level information in the auto-scaling group configuration message, a level to which a to-be-deployed auto-scaling group belongs, and determine a master service server in the level.

The communications module 710 is further configured to send the auto-scaling group configuration message to the master service server in the level.

Optionally, in some embodiments, the communications module 710 may further receive a conflict resolution policy sent by the user through the API or the visualization window. The communication module 710 sends the conflict resolution policy to each service server in the level, including the master service server and a slave service server.

Optionally, in some embodiments, the communications module 710 may further be configured to receive a creation result that is of an auto-scaling group and that is sent by a management apparatus on the master service server in the level.

Optionally, in some embodiments, the communications module 710 may further be configured to receive a notification sent by the management apparatus on the master service server that sends an auto-scaling command discarded by an overlapping service server, where the notification is about a conflict of the auto-scaling command.

Optionally, in some embodiments, the communications module 710 may further send the notification about the conflict of the auto-scaling command to the user through the API or the visualization window.

It should be understood that the auto-scaling group management apparatus 700 herein is embodied in a form of a function module. The term "module" herein may be implemented in a form of software and/or hardware. This is not specifically limited. For example, the "module" may be a software program, a hardware circuit, or a combination thereof that implements the foregoing functions. When any one of the foregoing modules is implemented by using software, the software exists in a form of a computer program instruction stored in a memory. A processor executes the program instruction to implement the foregoing method procedures. The processor may include but is not limited to at least one of the following computing devices that run various types of software: a central processing unit (CPU), a microprocessor, a digital signal processor (DSP), a microcontroller unit (MCU), an artificial intelligence processor, or the like. Each computing device may include one or more cores configured to perform an operation or processing by executing a software instruction. The processor may be an independent semiconductor chip, or may be integrated with another circuit to constitute a semiconductor chip. For example, the processor may constitute a system on chip (SoC) with another circuit (for example, an encoding/decoding circuit, a hardware acceleration circuit, or various bus and interface circuits). Alternatively, the processor may be integrated into an application-specific integrated circuit (ASIC) as a built-in processor of the ASIC, and the ASIC integrated with the processor may be independently packaged or may be packaged with another circuit. The processor includes a core configured to perform an operation or processing by executing a software instruction, and may further include a necessary hardware accelerator, for example, a field programmable gate array (FPGA), a programmable logic device (PLD), or a logic circuit that implements a special-purpose logic operation.

When the foregoing modules are implemented by using the hardware circuit, the hardware circuit may be implemented by a general-purpose central processing unit (CPU), a microcontroller unit (MCU), a micro processing unit (VIPU), a digital signal processor (DSP), and a system on chip (SoC). Certainly, the hardware circuit may alternatively be implemented by an application-specific integrated circuit (ASIC) or a programmable logic device (PLD). The PLD may be a complex programmable logic device (CPLD), a field programmable gate array (FPGA), generic array logic (GAL), or any combination thereof. The PLD may run necessary software or does not depend on software to execute the foregoing method procedures.

Figure 8:
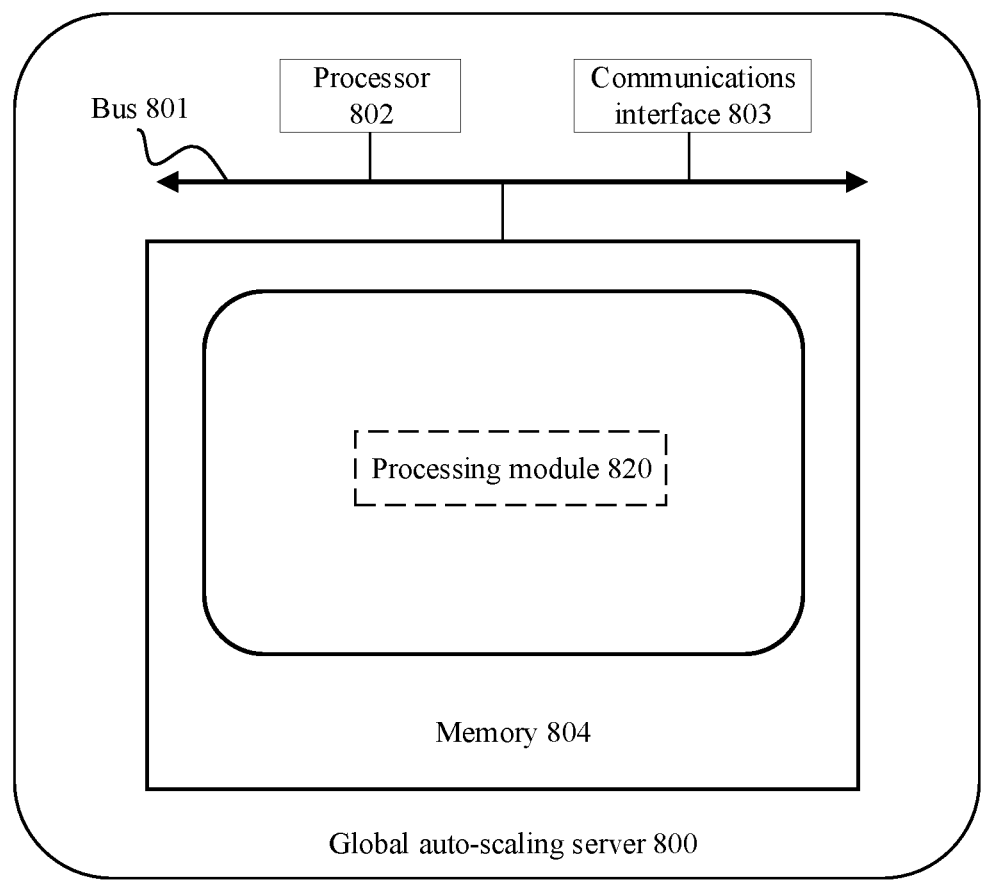
FIG. 8 is a diagram of a global auto-scaling server in a service providing system according to an embodiment.

FIG. 8 is a diagram of a global auto-scaling server 800 in a service providing system according to an embodiment.

The service providing system includes at least one global auto-scaling server 800 shown in FIG. 8. The global auto-scaling server 800 includes a processor 802, a communications interface 803, and a memory 804. Optionally, the global auto-scaling server 800 further includes a bus 801, and the processor 802, the memory 804, and the communications interface 803 communicate with each other through the bus 801.

The processor 802 may be a general-purpose central processing unit (CPU), and is configured to execute related program code, to implement a part performed by an auto-scaling group management apparatus side in the auto-scaling group management method in the method embodiment of this application.

The memory 804 may include a volatile memory, for example, a random access memory (RAM). Alternatively, the memory 804 may include a non-volatile memory, for example, a read-only memory (ROM), a flash memory, a hard disk drive (HDD), or a solid-state drive (SSD). The memory 804 stores executable code. The processor 802 executes the executable code to perform the foregoing auto-scaling group management method. The memory 804 may further include another software module, for example, an operating system, required for running a process. The operating system may be LINUX™, UNIX™, WINDOWS™, or the like.

Specifically, the memory 804 stores executable code used to implement the processing module 720. The communications module 710 in the auto-scaling group management apparatus 700 is implemented through the communications interface 803.

The communications module 710 in the auto-scaling group management apparatus 700 is implemented through the communications interface 803. Communication is established between the at least one global auto-scaling server 800 in the service providing system by using a communications network.

Figure 9:
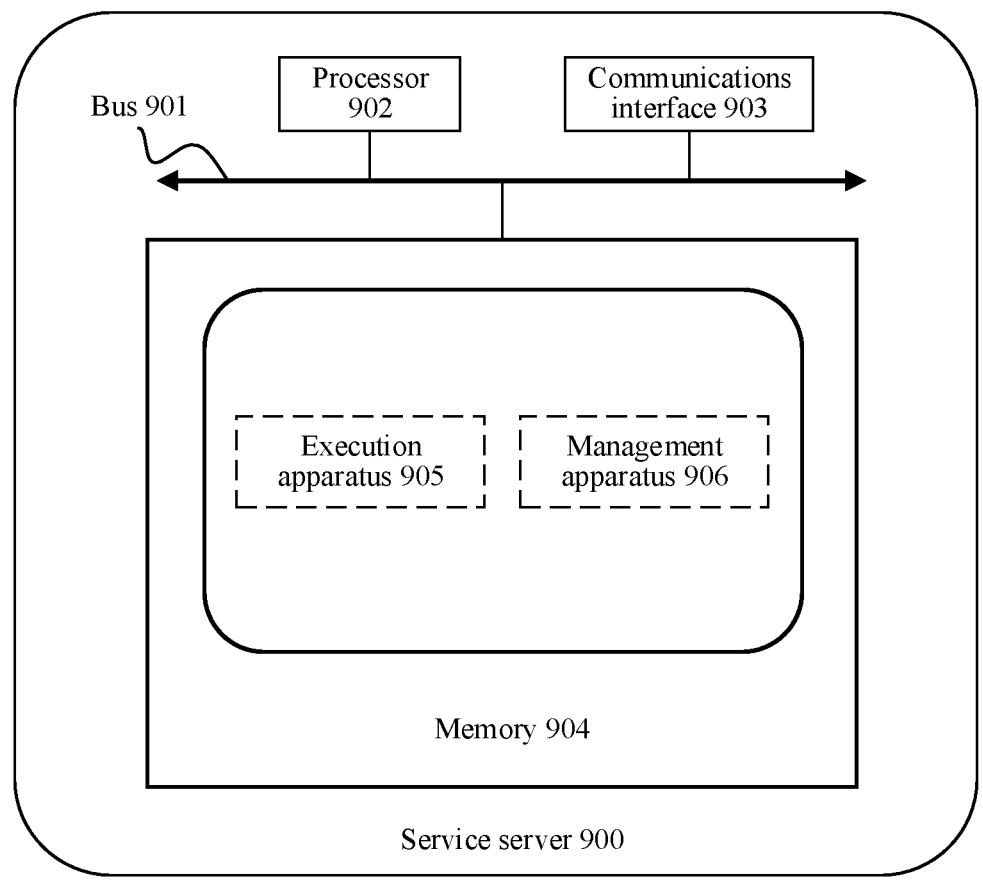
FIG. 9 is a diagram of a service server in a service providing system according to an embodiment.

FIG. 9 is a diagram of a service server 900 in a service providing system according to an embodiment.

The service providing system includes at least one service server 900 shown in FIG. 9. The service server 90 includes a processor 902, a communications interface 903, and a memory 904. Optionally, the service server 900 further includes a bus 901, and the processor 902, the memory 904, and the communications interface 903 communicate with each other through the bus 901.

The processor 902 may be a general-purpose central processing unit, and is configured to execute a related program, to implement a part performed by a service server side in the auto-scaling group management method in the method embodiment of this application.

The memory 904 may include a volatile memory, for example, a random access memory (RAM). Alternatively, the memory 904 may include a non-volatile memory, for example, a read-only memory (ROM), a flash memory, an HDD, or an SSD. The memory 904 stores executable code. The processor 902 executes the executable code to perform the foregoing auto-scaling group management method. The memory 904 may further include another software module, for example, an operating system, required for running a process. The operating system may be LINUX™ UNIX™ WINDOWS™, or the like.

Specifically, the memory 904 stores executable code used to implement an execution apparatus 905 and a management apparatus 906. The memory 904 further includes another software module, for example, the operating system required for running the process.

The server in FIG. 8 or FIG. 9 may specifically be a blade server, a tower server, a personal computer, or another computer having a computing function.

All or some of the foregoing embodiments may be implemented by using software, hardware, firmware, or any combination thereof. When software is used to implement the embodiments, the foregoing embodiments may be implemented entirely or partially in a form of a computer program product. The computer program product includes one or more computer instructions or computer programs. When the computer instructions or the computer programs are loaded or executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists, where A and B may be singular or plural. In addition, the character "/" in this specification usually represents an "or" relationship between the associated objects, or may represent an "and/or" relationship. For details, refer to foregoing and following descriptions for understanding.

In this application, "at least one" means one or more, and "a plurality of" means two or more. "At least one item (piece) of the following" or a similar expression thereof refers to any combination of these items, including any combination of a singular item (piece) or plural items (pieces). For example, at least one item (piece) of a, b, or c may indicate: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

What is claimed is:

1. An auto-scaling group management method of a service providing system including an auto-scaling group management apparatus and a plurality of levels, each level comprising at least one service server, the management method comprising:

receiving, by the auto-scaling group management apparatus, a first auto-scaling group configuration message, the first auto-scaling group configuration message comprising first auto-scaling group level information of a first auto-scaling group, first auto-scaling group initialization configuration information of a compute instance of the first auto-scaling group, and first auto-scaling group policy information of the first auto-scaling group;

creating, by the auto-scaling group management apparatus, the compute instance of the first auto-scaling group based on the first auto-scaling group initialization configuration information, the compute instance being created in a service server comprised in a level indicated by the first auto-scaling group level information, the level comprising an administrative level, a geographic level, a region level, or an auto-scaling group level;

performing, by the auto-scaling group management apparatus, an operation on the compute instance of the first auto-scaling group based on the first auto-scaling group policy information;

receiving, by the auto-scaling group management apparatus, a second auto-scaling group configuration message comprising second auto-scaling group level information of a second auto-scaling group, second auto-scaling group initialization configuration information of a second compute instance of the second auto-scaling group, second auto-scaling group policy information of the second auto-scaling group, and a conflict resolution policy indicating a second auto-scaling group priority of the second auto-scaling group policy information;

creating, by the auto-scaling group management apparatus, the second compute instance based on the second auto-scaling group initialization configuration information in a second service server comprised in a second level indicated by the second auto-scaling group level information, the service server comprised in the level indicated by the first auto-scaling group level information overlaps the second service server comprised in the second level indicated by the second auto-scaling group level information;

performing, by the auto-scaling group management apparatus, an operation on the second compute instance of the second auto-scaling group based on the second auto-scaling group policy information; and sending, by the auto-scaling group management apparatus, the conflict resolution policy to an overlapping service server, wherein the overlapping service server is comprised in the level indicated by the first auto-scaling group level information and the second level indicated by the second auto-scaling group level information.

2. The management method according to claim 1, wherein the performing, by the auto-scaling group management apparatus, the operation on the compute instance of the first auto-scaling group based on the first auto-scaling group policy information comprises:

generating, by the auto-scaling group management apparatus, a first auto-scaling command based on a running status of the compute instance and the first auto-scaling group policy information; and sending, by the auto-scaling group management apparatus, the first auto-scaling command to the service server on which the compute instance of the first auto-scaling group is created.

3. The management method according to claim 2, wherein the second auto-scaling group configuration message further comprises a conflict resolution policy indicating a second auto-scaling group priority of the second auto-scaling group policy information, and the management method further comprises:

sending, by the auto-scaling group management apparatus, the conflict resolution policy to an overlapping service server, wherein the overlapping service server is comprised in the level indicated by the first auto-scaling group level information and the second level indicated by the second auto-scaling group level information;

receiving, by the overlapping service server, the first auto-scaling command generated based on the first auto-scaling group policy information;

receiving, by the overlapping service server, a second auto-scaling command generated based on the second auto-scaling group policy information; and selecting, by the overlapping service server, the first auto-scaling command or the second auto-scaling command for execution according to the conflict resolution policy.

4. An auto-scaling group management method for an auto-scaling group management apparatus, the method comprising:

receiving a first auto-scaling group configuration message, the first auto-scaling group configuration message comprising first auto-scaling group level information of a first auto-scaling group, first auto-scaling group initialization configuration information of a compute instance of the first auto-scaling group, and first auto-scaling group policy information of the first auto-scaling group;

creating the compute instance of the first auto-scaling group based on the first auto-scaling group initialization configuration information, the compute instance being created in a service server comprised in a level indicated by the first auto-scaling group level information, the level comprising an administrative level, a geographic level, a region level, or an auto-scaling group level;

performing an operation on the compute instance of the first auto-scaling group based on the first auto-scaling group policy information;

receiving a second auto-scaling group configuration message comprising second auto-scaling group level information of a second auto-scaling group, second auto-scaling group initialization configuration information of a second compute instance of the second auto-scaling group, second auto-scaling group policy information of the second auto-scaling group, and a conflict resolution policy indicating a second auto-scaling group priority of the second auto-scaling group policy information;

creating the second compute instance based on the second auto-scaling group initialization configuration information in a second service server comprised in a second level indicated by the second auto-scaling group level information, the service server comprised in the level indicated by the first auto-scaling group level information overlaps the second service server comprised in the second level indicated by the second auto-scaling group level information;

performing an operation on the second compute instance of the second auto-scaling group based on the second auto-scaling group policy information; and sending the conflict resolution policy to an overlapping service server, wherein the overlapping service server is comprised in the level indicated by the first auto-scaling group level information and the second level indicated by the second auto-scaling group level information.

5. The management method according to claim 4, wherein the performing the operation on the compute instance of the first auto-scaling group based on the first auto-scaling group policy information comprises:

generating a first auto-scaling command based on a running status of the compute instance and the first auto-scaling group policy information; and sending the first auto-scaling command to the service server on which the compute instance of the first auto-scaling group is created.

6. The management method according to claim 5, wherein the performing the operation on the second compute instance of the second auto-scaling group based on the second auto-scaling group policy information comprises:

generating a second auto-scaling command based on a running status of the second compute instance and the second auto-scaling group policy information; and sending the second auto-scaling command to a service server on which the second compute instance is created.

7. An auto-scaling group management method of a service server, the service server is comprised in a level indicated by first auto-scaling group level information of a first auto-scaling group and a second level indicated by second auto-scaling group level information of a second auto-scaling group, the level comprising an administrative level, a geographic level, a region level, or an auto-scaling group level, the management method comprising:
- receiving a first auto-scaling command delivered by an auto-scaling group management apparatus, the first auto-scaling command being generated by the auto-scaling group management apparatus based on first auto-scaling group policy information comprised in a received first auto-scaling group configuration message;
- receiving a second auto-scaling command delivered by the auto-scaling group management apparatus, the second auto-scaling command generated by the auto-scaling group management apparatus based on second auto-scaling group policy information comprised in a received second auto-scaling group configuration message;
- receiving a conflict resolution policy delivered by the auto-scaling group management apparatus, the conflict resolution policy indicating a priority of the auto-scaling policy information, the conflict resolution policy indicating a second auto-scaling group priority of the second auto-scaling group policy information; and
- selecting, according to the conflict resolution policy, to execute the first auto-scaling command or the second auto-scaling command.

\* \* \* \* \*